United States Patent
Mizoguchi et al.

(10) Patent No.: US 7,925,364 B2
(45) Date of Patent: Apr. 12, 2011

(54) AUDIO REPRODUCTION DEVICE

(75) Inventors: Hiroaki Mizoguchi, Osaka (JP); Hiroyuki Kotani, Osaka (JP); Masami Yasui, Nara (JP); Toshikazu Murai, Osaka (JP); Nobuo Moritani, Osaka (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 11/597,720

(22) PCT Filed: May 31, 2005

(86) PCT No.: PCT/JP2005/009998
§ 371 (c)(1),
(2), (4) Date: May 15, 2007

(87) PCT Pub. No.: WO2005/117013
PCT Pub. Date: Dec. 8, 2005

(65) Prior Publication Data
US 2007/0270986 A1     Nov. 22, 2007

(30) Foreign Application Priority Data
May 31, 2004   (JP) ................. 2004-161054

(51) Int. Cl.
G06F 17/00   (2006.01)
(52) U.S. Cl. ........................................ 700/94
(58) Field of Classification Search ............. 700/94; 381/104; 386/96; 341/60, 61, 95; 84/603, 84/605; 704/500–504
See application file for complete search history.

(56) References Cited

U.S. PATENT DOCUMENTS
2001/0017821 A1   8/2001   Inoue et al.
2003/0009246 A1*  1/2003   Van De Kerkhof et al. .... 700/94

FOREIGN PATENT DOCUMENTS
| EP | 1 260 979 | 11/2002 |
| EP | 1 302 947 | 4/2003 |
| EP | 1 394 791 | 3/2004 |
| JP | 10-308914 | 11/1998 |
| JP | 11-086446 | 3/1999 |
| JP | 11-185461 | 7/1999 |

OTHER PUBLICATIONS

European Search Report issued Feb. 20, 2009 in the corresponding European application.
"Compact Disk Player CDJ-100S: Operating Instructions," Internet Citation, XP002273766 Retrieved from the internet, URL: http://www.djsound.ru/files/74/cdj100S.pdf.

* cited by examiner

Primary Examiner — Andrew C Flanders
(74) Attorney, Agent, or Firm — Wenderoth, Lind & Ponack, L.L.P.

(57) ABSTRACT

Provided is an audio reproduction device capable of immediately starting to reproduce audio data, particularly compressed audio data, from an arbitrary point in a forward or a backward direction at an arbitrary speed. In the case where data, to be reproduced, which is stored in a storage device is compressed data, the compressed data is temporarily stored in a RAM. Then, the stored compressed data is decoded by a decoder, thereby extracting a segment of PCM data. The segment of PCM data is supplied to a PCM data buffer formed in a RAM via a reproduction controlling microcomputer. Based on an operation of a rotational operation element, the PCM data stored in the PCM data buffer formed in the RAM is reproduced by a reproduction processing circuit, thereby reducing a rapid change in reproduction speed.

3 Claims, 13 Drawing Sheets

Fig. 12

| FRAME OFFSET MANAGING TABLE (70) ||
|---|---|
| FRAME NUMBER | OFFSET BYTE |
| ⋮ | ⋮ |
| n | a |
| n + 1 | a + s1 |
| n + 2 | a + s1 + s2 |
| n + 3 | a + s1 + s2 + s3 |
| ⋮ | ⋮ |

S1: FRAME SIZE OF nTH FRAME
S2: FRAME SIZE OF (n+1)TH FRAME
S3: FRAME SIZE OF (n+2)TH FRAME

AUDIO REPRODUCTION DEVICE

TECHNICAL FIELD

The present invention relates to an audio reproduction device which reproduces a sound based on compressed audio data stored in a storage medium such as a semiconductor memory, as exemplified by an optical disk and a memory card, as exemplified by a compact disk.

BACKGROUND ART

In recent years, a so-called audio reproduction device for a DJ, which is capable of reproducing a sound by variably controlling a reading speed of digital audio data, i.e., by a so-called scratching, has been used. Generally, the audio reproduction device for a DJ (patent document 1, for example) temporarily stores music data read from a storage medium in a RAM having a high-speed access performance, and reads the music data stored in the RAM in accordance with a variable speed operation performed by a user so as to reproduce a sound, thereby making it possible to rapidly change a reproduction speed.

In such an audio reproduction device for a DJ, as well as a change in the reproduction speed, a sound is required to be immediately reproduced from an arbitrary reproduction start point. When the sound starts to be reproduced, an overhead such as a reading time of data is generated. Therefore, in order to immediately response to a request for reproducing data, music data corresponding to several seconds starting from a point at which recorded data may start to be reproduced is temporarily stored in a memory of the RAM, and while the recorded data stored in the memory (RAM) is being reproduced, subsequent music data is read from the storage medium, and stored in the memory thereof.
[patent document 1] Japanese Laid-Open Patent Publication No. 11-86446

DISCLOSURE OF THE INVENTION

Problems to be Solved by the Invention

In a case where audio data to be read from the storage medium is compressed when reproducing music, it is difficult to extract, from a series of data stream, a portion of compressed music data, corresponding to an arbitrary real time period, which is designated by a variable reproduction operation performed by the user. As an example of such compressed music data, compressed music data exemplified by MP3 (MPEG-1 Audio Layer III) will be described.

Generally, in MP3 data, there is a correlation between data of a current frame and data of an immediately preceding frame. Therefore, even if the data of the current frame, which is a target frame, is only decoded from an intermediate position of the music, the decoded data cannot ensure a continuity of an audio waveform. In addition, due to a bit reservoir, there may be a case where the data of the target frame is included in the immediately preceding frame. That is, by decoding a series of MP3 data sequentially from a beginning thereof, continuous audio data can be obtained.

Furthermore, in the compressed music data exemplified by MP3, sizes of frames comprising the compressed music data may be variable. In other words, the compressed music data exemplified by MP3 may be an audio data string compressed using a variable bit rate.

Strictly speaking, because the sizes of the frames are written in frame headers, each of which is provided in a head of each of the frames, a size of each of the frames only can be found by referring to each of the frame headers. Therefore, in a case where data, corresponding to a real time period, which is designated by a scratch operation performed by the user is extracted, it is necessary to read each of the frame headers sequentially from the beginning of music.

Thus, the larger an amount of music data is, and the closer a reproduction start frame designated by the scratch operation performed by the user is to the end of the music, the more a time required for reading compressed music data to be reproduced in accordance with the scratch operation is increased. Specifically, depending on music to be reproduced or a reproduction start point, even when compressed music data corresponding to several seconds is stored in the RAM, compressed music data to be reproduced cannot be extracted from a recording medium while the compressed music data corresponding to several seconds stored in the RAM is being reproduced.

In order to solve a problem mentioned above, an object of the present invention is to provide an audio reproduction device capable of immediately starting to reproduce audio data, particularly compressed audio data, stored in a storage medium, from an arbitrary point in a forward direction or a backward direction at an arbitrary speed, thereby making it possible to continuously perform a reproduction.

Solution to the Problems

To achieve the above object, an audio reproduction device according to the present invention comprises:
 a recording medium for recording compressed audio data;
 decoding means for converting the compressed audio data to real-time digital sampling data;
 data storage means for temporarily storing a first fragment of the real-time digital sampling data;
 data reading means (11) for designating a reproduction position, on the recording medium, of a second fragment, of the real-time digital sampling data (PCM), which retains a continuity of the real-time digital sampling data at both ends of the first fragment of the real-time digital sampling data, and reading the second fragment of the real-time digital sampling data (PCM); and
 reproduction means for reproducing, in order of time, the first fragment of the real-time sampling data stored in the data storage means in a forward or a backward direction at a variable speed, wherein
 the second fragment of the real-time digital sampling data is supplied to the data storage means so as to retain the continuity of the real-time digital sampling data at the both ends of the first fragment of the real-time digital sampling data stored in the data storage means, by means of the data reading means and the decoding means, and a series of the compressed audio data is continuously reproduced in the forward and the backward direction at an arbitrary speed, by means of the reproduction means.

Effect of the Invention

By means of the aforementioned configuration, the present invention can realize an audio reproduction device for a DJ capable of reproducing audio data and compressed audio data, freely changing a reproduction speed thereof, and capable of immediately starting to perform a reproduction from an arbitrary start point which is previously designated.

BRIEF DESCRIPTION OF THE DRAWINGS

FIG. 12 is a diagram describing a frame offset managing table 70 of the RAM shown in FIG. 8.

Figure 1:
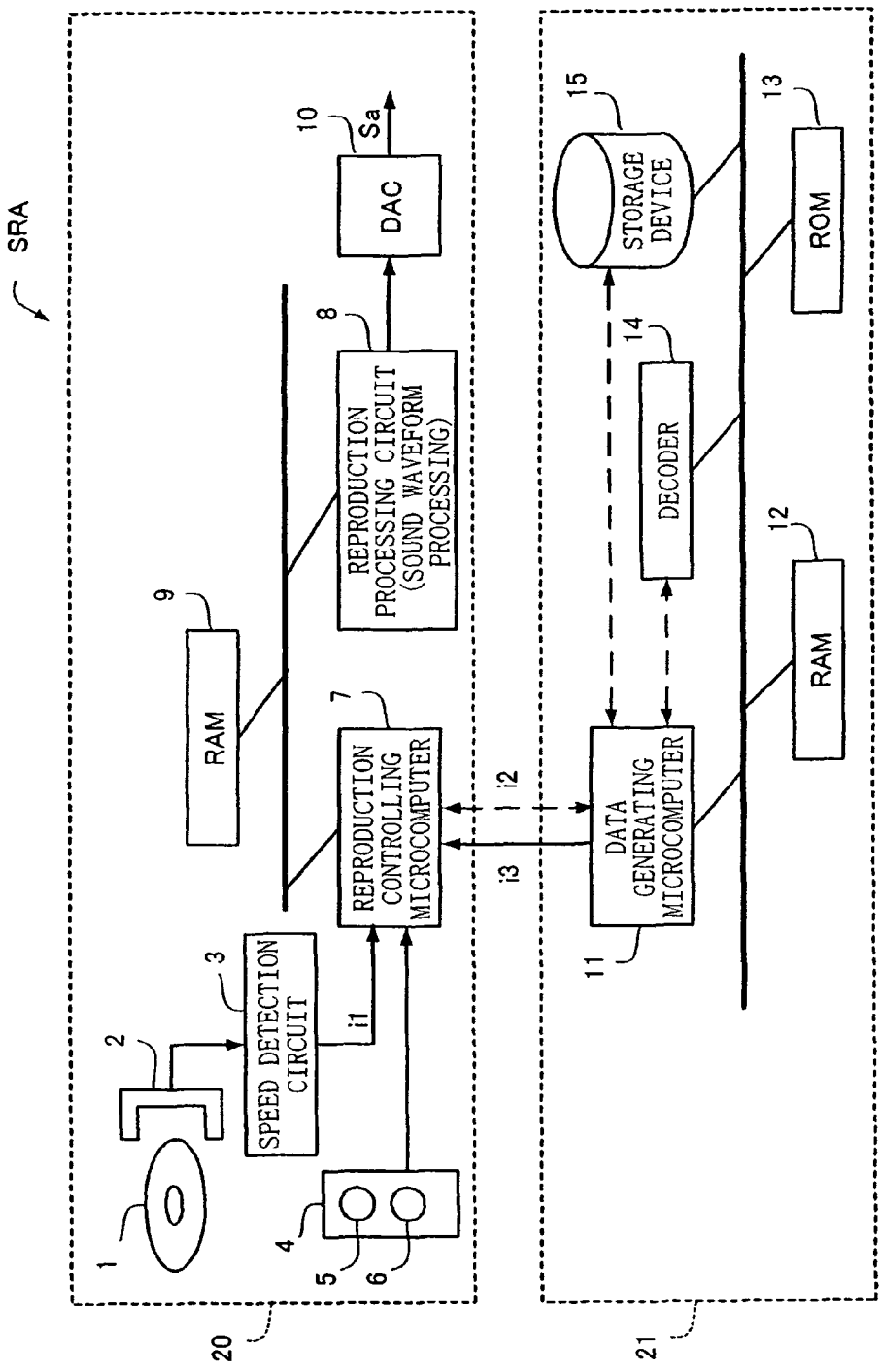
FIG. 1 is a block diagram illustrating a digital turntable configured as an audio reproduction device according to an embodiment of the present invention.

DESCRIPTION OF THE REFERENCE CHARACTERS 1 rotational operation element
2 speed sensor
3 speed detection circuit
4 display/operation board
5 reproduction start button or reproduction start point calling button
6 reproduction start point setting button
7 reproduction controlling microcomputer
8 reproduction processing circuit
9 RAM
10 DAC
11 data generating microcomputer
13 ROM
14 decoder
15 storage device
20 reproduction controlling section
21 data generating section
31 UI processing section
32 operation element speed computing section
33 reproduction data managing section
34 reproduction speed controlling section
35 PCM auxiliary buffer managing section
36 PCM reproduction buffer managing section
37 reproduction controlling section side microcomputer communication controlling section
41 PCM auxiliary buffer 1
42 PCM auxiliary buffer 2
43 PCM auxiliary buffer 3
44 PCM reproduction buffer
50 data generating section side microcomputer communication controlling section
51 recording medium managing section
52 data generating section
53 CD-MP3 analyzing section
54 CD-DA analyzing section
55 memory card analyzing section
56 frame conversion section
57 frame offset managing section
58 dummy frame generating section
59 decode controlling section
60 PCM data transfer controlling section
70 frame offset managing table
71 decoder input side data string buffer
72 decoder output side data string buffer
73 dummy frame buffer
i1 rotation speed data
i2 data request command/response signal
i3 PCM data
Sa audio signal

BEST MODE FOR CARRYING OUT THE INVENTION

Prior to describing an audio reproduction device according to an embodiment of the present invention in detail with reference to the accompanying drawings, a basic concept thereof will be firstly described. As described above, in the case where digital music data is recorded in the recording medium, a reproduction start position and a reproduction speed which are provided by a scratch operation performed by the user operating the recording medium at a variable speed do not necessarily coincide with a position at which the digital music data is read so as to reproduce a sound. Therefore, it is not possible to reproduce the sound in accordance with the scratch operation.

Thus, in the present invention, the digital music data located at a position displaced, by a predetermined amount, from a reproduction start position designated by the scratch operation is read, thereby reducing a displacement between the reproduction start position, on the recording medium, which is designated by the scratch operation performed by the user, and a position at which an entirety of audio data can be actually reproduced from the digital music data. Furthermore, the digital music data is read from a position adjusted in the aforementioned manner, and a sound is generated based on the read digital music data, thereby realizing a sound reproduction which can be performed in accordance with the scratch operation. Hereinafter, referring to the drawings, the audio reproduction device according to the embodiment of the present invention will be described in detail.

As shown in FIG. 1, in the embodiment of the present invention, an audio reproduction device SRA is used for performing a process of reproducing a sound generated based on digital audio data compressed at a variable bit rate so as to comply with MP3, for example. Preferably, the audio reproduction device SRA is configured as a digital turntable. The audio reproduction device SPA mainly comprises a reproduction controlling section 20 and a data generating section 21. The reproduction controlling section 20 includes a rotational operation element 1, a speed sensor 2, a speed detection circuit 3, a display/operation board 4, a reproduction controlling microcomputer 7, a reproduction processing circuit 8, a RAM 9, and a DAC 10. The rotational operation element 1 is formed to simulate a recording medium in which music data to be reproduced is recorded. In response to a rotational operation performed by the user, the rotational operation element 1 receives an instruction on a reproduction speed and a reproduction start position. Note that the reproduction controlling microcomputer 7, the RAM 9, and the reproduction processing circuit 8 are connected to each other via a signal line such as a data bus.

The speed sensor 2 detects a rotation of the rotational operation element 1 and generates a rotation signal. The rotation signal includes information regarding a rotation speed and a rotation position of the rotational operation element 1. The speed detection circuit 3 generates, based on the rotation signal, rotation data i1 indicating the rotation speed and the rotation position of the rotational operation element 1. This configuration can be realized by detecting, by means of a light sensor, a light passing through slits engraved at regular intervals on a circumference of a turntable rotated manually or by a motor drive, and counting the light at a constant interval.

The display/operation board 4 is provided with a reproduction start point calling button 5, a reproduction start point setting button 6, and the like. Note that the reproduction start point calling button 5 may simply be a reproduction start button.

The reproduction start point calling button (reproduction start button) 5 is input means through which the user instructs the audio reproduction device SRA to start to reproduce a sound. The reproduction start point setting button 6 is a button through which the user instructs the audio reproduction device SRA to set a point (position), on the recording medium, at which a sound starts to be reproduced. Properly speaking, this "point" indicates a reproduction start position on the rotational operation element 1 formed to simulate the recording medium. Note that in the display/operation board 4, a display device (not shown) is disposed such that the user can perform an operation more easily.

Figure 2:
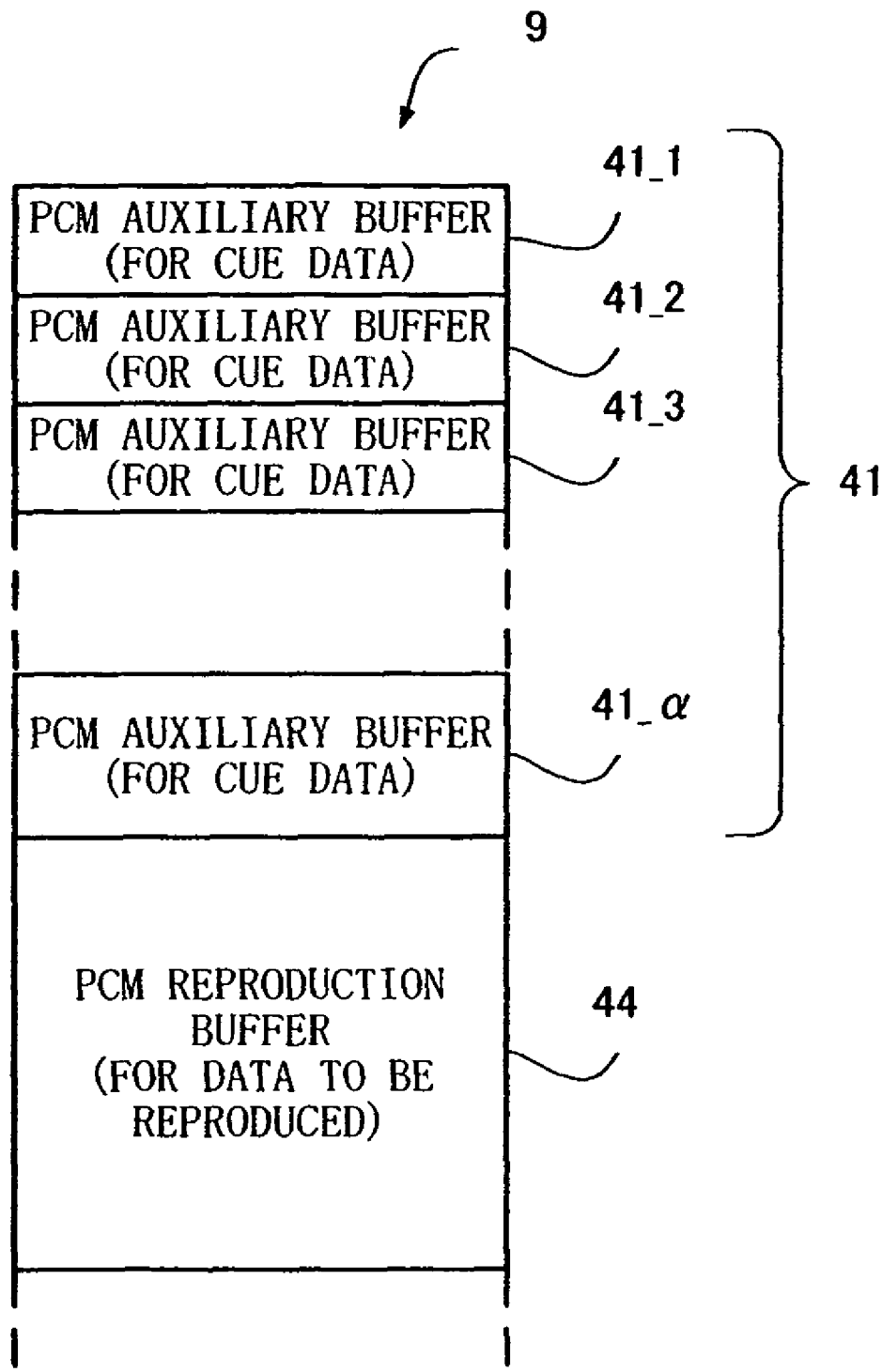
FIG. 2 is a diagram describing an internal storage area of a RAM of a reproduction controlling section shown in FIG. 1.

Next, referring to FIG. 2, an internal storage configuration of the RAM 9 will be described. An internal storage area of the RAM 9 includes $\alpha$ PCM auxiliary buffers 41_1 to 41_$\alpha$ ($\alpha$ is an arbitrary integer) and one PCM reproduction buffer 44. Note that each or an entirety of the PCM auxiliary buffers 41_1 to 41_$\alpha$ is generically referred to as the PCM auxiliary buffer 41.

The PCM auxiliary buffer 41 stores, when the reproduction start point setting button 6 is pushed down, a fragment of PCM data corresponding to a short time period, three seconds, for example, including the reproduction start point and the vicinity thereof, as well as a set of an album, a track, a frame number, and an offset value. As described above, the $\alpha$ PCM auxiliary buffers 41_1 to 41_$\alpha$ are disposed, thereby making it possible to simultaneously set a plurality of reproduction start points.

On the other hand, the PCM reproduction buffer 44 only stores a fragment of PCM data, to be reproduced, which corresponds to several seconds in the vicinity of the reproduction start point, the fragment of PCM data being read from the recording medium. In the present embodiment, 16-bit stereo data having a sampling frequency of 44.1 kHz is stored in the PCM reproduction buffer 44. Considering a purpose, the PCM reproduction buffer 44 requires a certain buffer size in order to follow a rapid change in a reproduction speed. However, a size of the PCM reproduction buffer 44 is sufficient if data, which can be reproduced for a real time period of approximately 15 seconds, is stored therein. An amount of data to be reproduced for 15 seconds corresponds to 44100×2×2×15=2.646 M bytes. Note that the PCM reproduction buffer 44 is configured as a ring buffer.

Figure 3:
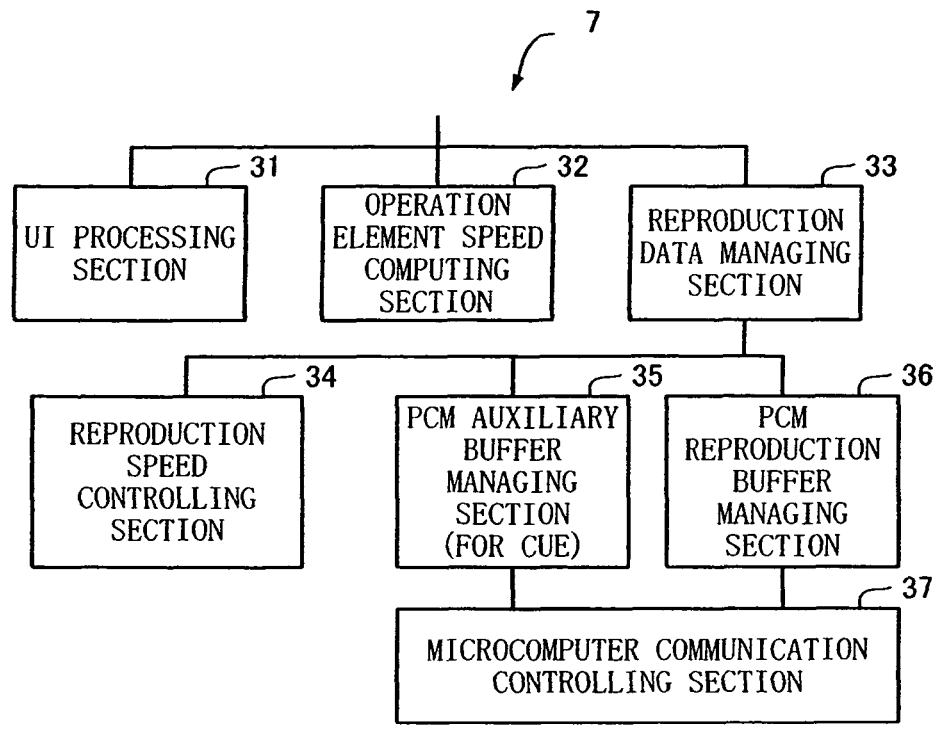
FIG. 3 is a diagram hierarchically illustrating a software function of a reproduction controlling microcomputer of the reproduction controlling section shown in FIG. 1.

Referring to FIG. 3, a software function of the reproduction controlling microcomputer 7 will be described. As shown in FIG. 3, software of the reproduction controlling microcomputer 7 is configured in a hierarchical manner, and mainly includes an UI processing section 31, an operation element speed computing section 32, and a reproduction data managing section 33.

The UI processing section 31 causes the display device of the display/operation board 4 to display information such as a reproduction position, and monitors whether the aforementioned buttons of the display/operation boards 4 are pushed down. The operation element speed computing section 32 converts the rotation speed data i1 transmitted from the speed detection circuit 3 to real-time reproduction speed data. The reproduction data managing section 33 manages a state of each of the PCM buffers provided in the RAM 9 to be described below, and includes a reproduction speed controlling section 34, a PCM auxiliary buffer managing section 35, and a PCM reproduction buffer managing section 36.

The reproduction speed controlling section 34 transmits the real-time reproduction speed data outputted from the operation element speed computing section 32 to the reproduction processing circuit 8. The PCM auxiliary buffer managing section 35 monitors a remaining state of data stored in each of the PCM auxiliary buffers 41 to 43 which are provided in the RAM 9, and outputs a request for obtaining PCM data to the data generating microcomputer 11 via the microcomputer communication controlling section 37, if necessary. The PCM reproduction buffer managing section 36 monitors a remaining state of data stored in the PCM reproduction buffer 44 provided in the RAM 9, and outputs a request for obtaining PCM data to the data generating microcomputer 11 via the microcomputer communication controlling section 37, if necessary.

In other words, the PCM reproduction buffer managing section 36 sequentially updates PCM data stored in the PCM reproduction buffer 44 such that the PCM reproduction buffer 44 always maintains a sufficient amount of PCM data stored therein, by comprehensively taking into consideration the remaining state of the PCM data stored in the PCM reproduction buffer 44, the reproduction position and reproduction speed data, etc. As such, with the PCM reproduction buffer 44 provided in the RAM 9, the PCM reproduction buffer managing section 36 provides data storage means for temporarily storing a fragment of real-time digital sampling data.

By operating the display/operation board 4 configured in the aforementioned manner, the user can issue an instruction for immediately reproducing music recorded in the recording medium such as a CD from a specific point. As a specific operation method, while music recorded as compressed audio data stored in the recording medium such as a CD is being reproduced, the user pushes down the reproduction start setting button 6 at a point where he or she wishes to set a reproduction start point, thereby causing the audio reproduction device SRA to store the reproduction start point. A plurality of reproduction start points can be stored. Then, when the user wishes to reproduce the music from the reproduction start point having previously been set, he or she pushes down the reproduction start calling button 5, thereby causing the audio reproduction device SRA to immediately prepare data to be reproduced, so as to immediately start to perform a reproduction.

Note that the reproduction processing circuit 8 provides reproduction means for reproducing, in order of time, the fragment of PCM data stored in the PCM reproduction buffer 44 in a forward or a backward direction at a variable speed. That is, the reproduction processing circuit 8 performs digital processing on audio data stored in the PCM reproduction buffer 44 based on the reproduction speed data outputted from the reproduction speed controlling section 34, and outputs the audio data on which the digital processing has been performed to the DAC 10. The audio data is digital data generated based on an audio waveform quantized at a sampling frequency. When the digitized audio data is converted to analog data by compressing and decompressing the audio waveform along a time axis in accordance with a reproduction speed, and outputted as an audio signal Sa, it becomes possible to output an audible sound in a similar manner to a case where an analog record is caused to be quickly or slowly rotated. Such digital processing performed on waveform data can be realized by an arithmetic processing generally utilizing DSP, etc. Note that the reproduction processing circuit 8 is configured so as to repeatedly reproduce the PCM data stored in the PCM reproduction buffer 44 from one end to the other end thereof.

Figure 4:
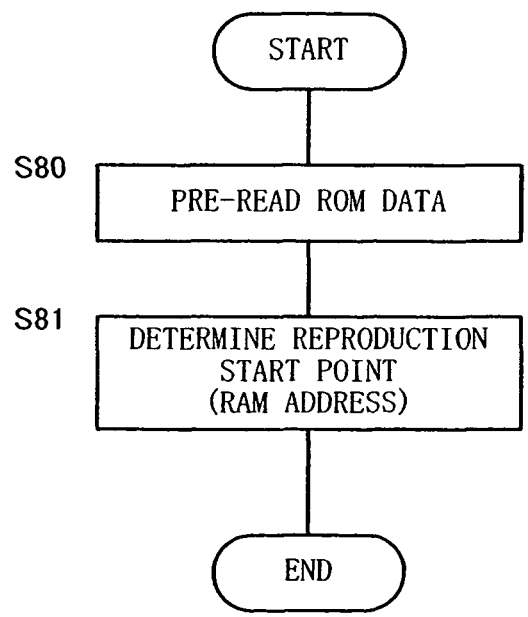
FIG. 4 is a flowchart illustrating an operation of a reproduction preparation process performed by the audio reproduction device shown in FIG. 1.

Referring to a flowchart shown in FIG. 4, an operation of the reproduction controlling section 20 configured in the aforementioned manner will be described. FIG. 4 is a flowchart illustrating a reproduction preparation process, and the reproduction preparation process is performed from a time when a power source of the device is turned on, for example, to a time when the device is to be in a state of starting to reproduce a sound.

Firstly, in step S80, data is prepared. This is because no PCM data to be reproduced is stored in the PCM reproduction buffer 44 in an initial state, and thus data needs to be prepared for performing the process. When the PCM data to be reproduced for several seconds is prepared, the control proceeds to subsequent step S81.

In step S81, a start address (point A) of the PCM data stored in the buffer is transmitted to the reproduction processing circuit 8. Note that the start address is stored in the RAM, and the PCM data has already been read from the RAM. That is, in step S81, a reproduction start position stored in the RAM is transmitted to the reproduction processing circuit 8. Thereafter, the reproduction preparation process will be ended.

Figure 6:
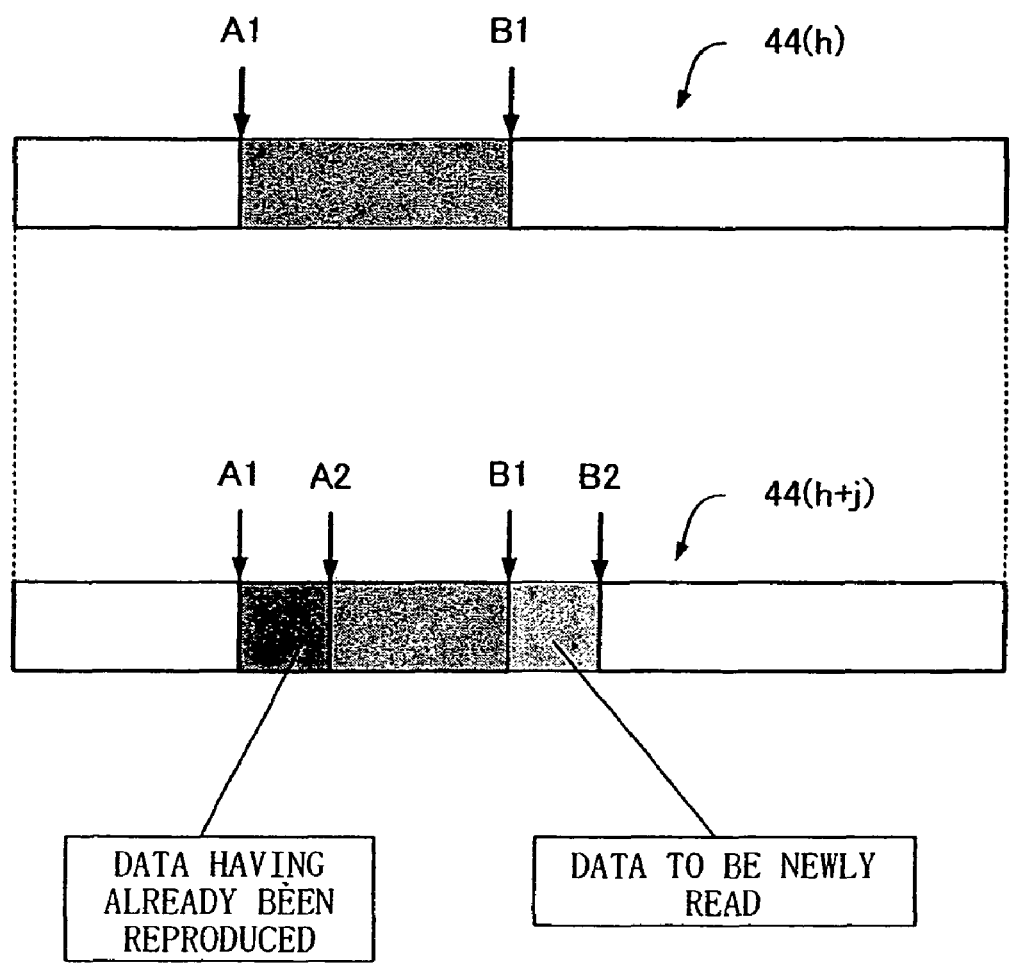
FIG. 6 is a diagram describing a state of PCM reproduction buffers shown in FIG. 2.

When an instruction to start to reproduce music is issued after the reproduction preparation process is ended (completed), the reproduction processing circuit 8 starts to reproduce a sound generated based on the PCM data from a point A1 (FIG. 6). While the PCM data is being reproduced, the PCM reproduction buffer managing section 36 regularly manages the PCM data stored in the PCM reproduction buffer 44.

Figure 5:
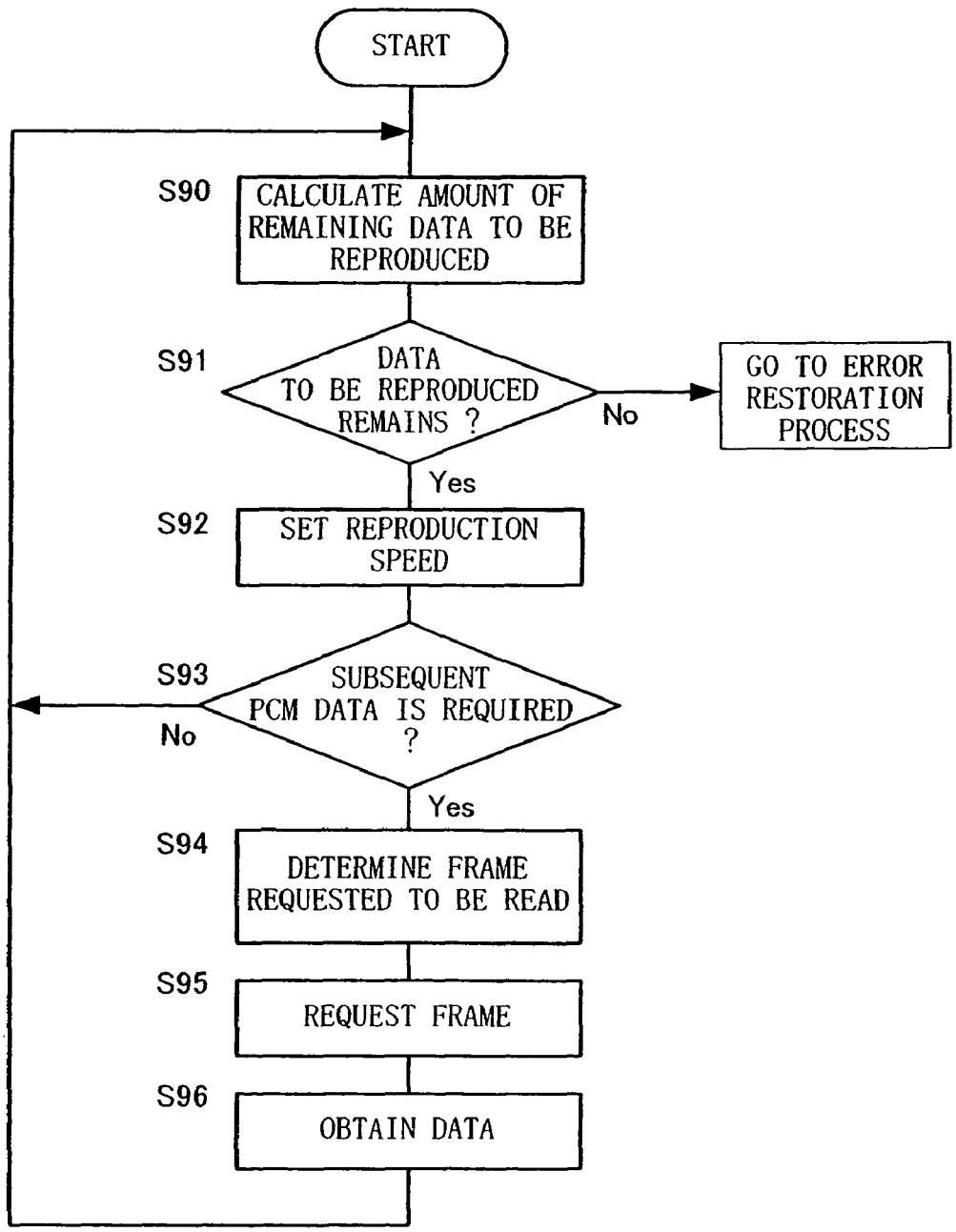
FIG. 5 is a flowchart illustrating an operation of a reproduction controlling process at a reproduction state.

Hereinafter, referring to a flowchart of FIG. 5, a method in which the PCM reproduction buffer managing section 36 regularly manages, while the PCM data stored in the PCM reproduction buffer 44 is being reproduced, the PCM data stored therein will be described in detail.

In step S90, based on the reproduction speed data obtained from the reproduction speed controlling section 34, an amount of PCM data which can be continuously reproduced in a reproducing direction, i.e., an amount of remaining data to be reproduced, is calculated. Thereafter, the control proceeds to subsequent step S91.

In step S91, it is determined whether or not the remaining data to be reproduced is stored in the PCM reproduction buffer 44. When the remaining data to be reproduced is stored in the PCM reproduction buffer 44, that is, when it is possible to continue a reproduction, the determination is Yes. Then, the control proceeds to subsequent step S92. On the other hand, when the remaining data to be reproduced is not stored in the PCM reproduction buffer 44, that is, when it is not possible to continue a reproduction, the determination is No. Then, an error restoration process is performed.

In step S92, a reproduction speed is transmitted to the reproduction processing circuit 8, thereby setting the reproduction speed. Thereafter, the control proceeds to subsequent step S93.

In step S93, it is determined whether or not subsequent PCM data is required. This determination can be made based on whether or not a sufficient amount of the remaining data, to be reproduced, which corresponds to a time period required for reading the subsequent data, is stored. When the amount of the remaining data is not sufficient, that is, when the reproduction may be interrupted, the determination is Yes. Then, the control proceeds to subsequent step S94.

In step S94, a frame number of the subsequent data is calculated, and a frame requested to be read is determined. Then, the control proceeds to subsequent step S95.

In step S95, the calculated frame number is notified to the data generating microcomputer 11 via the microcomputer communication controlling section 37, and PCM data of a frame corresponding to the frame number is requested. Thereafter, the control proceeds to subsequent step S96.

In step S96, in response to the scratch operation performed by the user, a sound (Sa) is read from the PCM data of the frame having been requested, thereby obtaining the subsequent PCM data. Thereafter, the control returns to step S90 mentioned above. On the other hand, the determination is No is step S93 mentioned above, the control skips steps S94, S95 and S96, and returns to step S90.

Next, referring to FIG. 6, a state of the PCM reproduction buffer 44, obtained when the PCM reproduction buffer managing section 36 performs regular processing on PCM data stored in the PCM reproduction buffer 44 and reproduces the PCM data in a forward direction, will be described. In FIG. 6, an upper image shows an exemplary state of the PCM reproduction buffer 44 at a time h, and a lower image shows an exemplary state of the PCM reproduction buffer 44 at a time h+j.

In order to facilitate the understanding of the following description, the state of the PCM reproduction buffer 44 at the time h and the state of the PCM reproduction buffer 44 at the time h+j are referred to as the PCM reproduction buffer 44(*h*) and the PCM reproduction buffer 44 (*h+j*), respectively. In the PCM reproduction buffer 44 (*h*), a reproduction position of PCM data being processed by the reproduction processing circuit 8 at the time h is denoted by the point A1. At this time, it is assumed that the PCM data to be reproduced from the point A1 to a point B1 is continuously stored in the PCM reproduction buffer 44 (*h*). Note that h is an arbitrary time, and j is an arbitrary time period.

On the other hand, in the PCM reproduction buffer 44 (h+j) which shows a state obtained j seconds after a state of the PCM reproduction buffer 44 (*h*), it is assumed that the reproduction position moves to a point A2. In this case, if data contained between the point B1 and a point B2 is newly prepared within j seconds, it is possible to continue reproducing the data in the forward direction Dr at this reproduction speed. The same is also true of reproducing the data in the backward direction, i.e., from the point B1 to the point A1.

If the reproduction is continued for a certain period of time, a fragment of PCM data, including the PCM data corresponding to several seconds before and after a time at which the reproduction position exists, is formed. Specifically, in the PCM reproduction buffer 44 (h+j), the point A1 is a start point of audio data currently being reproduced, the point A2 is a current reproduction position, and the point B2 is an end point of the audio data currently being reproduced. In this case, when necessary, the point A1 and the point A2 are referred to a reproduction start position A1 and a current reproduction position A2, respectively, and the point A1 and the point A2 are also generically referred to a reproduction position A. Similarly, the point B1 and the point B2 are referred to an end position of data at a reproduction start time B1 and an end position of data being reproduced B2, respectively, and the point B1 and the point B2 are also generically referred to an end position of data B.

In order to perform the reproduction in the forward direction Dr or the backward direction in a ceaseless manner, PCM data should continue to be supplied such that the PCM data is to be continuously arranged at the both ends of the fragment of the PCM data, i.e., at the point A1 and the point B2. That is, when the reproduction is performed in the forward direction, the PCM data should continue to be supplied after the point B2; and when the reproduction is performed in the backward direction, the PCM data should continue to be supplied before the point A1.

As described above, the PCM reproduction buffer 44 is configured as a ring buffer. Thus, j seconds reaches a time period in which the entirety of data stored in the PCM reproduction buffer 44 is reproduced, the reproduction start position A1 coincides with the end position of data being reproduced B2. However, the audio reproduction device SRA is configured such that when the current reproduction position A2 moves to an end of the PCM reproduction buffer 44, the current reproduction position A2 jumps to the other end of the PCM reproduction buffer 44 so as to reproduce data therefrom. Thus, the reproduction can be continued by continuously supplying data in the aforementioned manner.

In the process mentioned above, the faster a process of preparing audio data is performed, the more continuously the audio data can be reproduced while maintaining a high reproduction speed. Generally, a speed of performing the process of preparing the audio data depends on a performance of a drive which is a storage device, or a processing speed of a decoder.

Then, referring back to FIG. 1, a configuration of the data generating section 21 will be described. The data generating section 21 includes a data generating microcomputer 11, a RAM 12, a ROM 13, a decoder 14, and a storage device 15. The data generating microcomputer 11, the RAM 12, the ROM 13 and the decoder 14 are connected to each other via a signal line such as a data bus.

The data generating microcomputer 11 controls an entire operation of the data generating section 21. The RAM 12 temporarily retains PCM data generated based on music data and compressed audio data before being inputted to the decoder 14. The ROM 13 retains a silent dummy frame. The decoder 14 decodes the compressed audio data, thereby generating PCM data. Generally, the storage device 15 is a CD-ROM drive, a hard disk drive, a memory card interface, or the like. The storage device 15 can read recorded data such as compressed digital data from a storage medium.

Figure 7:
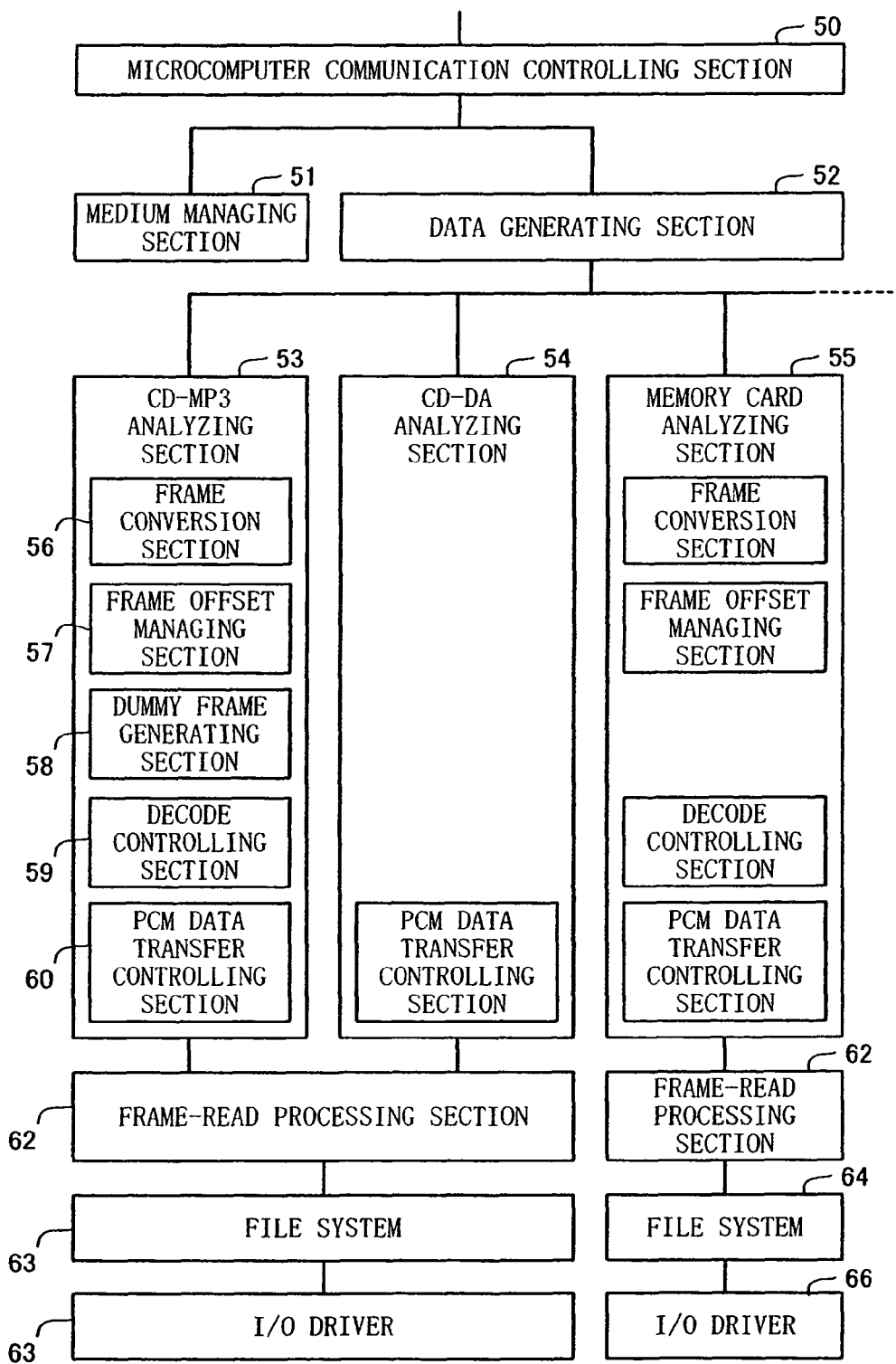
FIG. 7 is a functional block diagram illustrating a data generating microcomputer of a data generating section shown in FIG. 1.

Referring to FIG. 7, a software function of the data generating microcomputer 11 will be described. As shown in FIG. 7, software of the data generating microcomputer 11 is configured in a hierarchical manner, and mainly includes a medium managing section 51 and a data generating section 52. Note that the medium managing section 51 and the data generating section 52 operate based on a request transmitted from the reproduction controlling microcomputer 7 via the microcomputer communication controlling section 50. The medium managing section 51 manages various information regarding a recording medium in which audio data is currently being read.

The data generating section 52 includes a CD-MP3 analyzing section 53 operable to individually perform a process depending on target data to be read, a CD-DA analyzing section 54, and a memory card analyzing section 55. The CD-MP3 analyzing section 53 and the CD-DA analyzing section 54 instructs a frame-read processing section 61, which is shared therebetween, to read frame data. The memory card analyzing section 55 instructs a frame-read processing section 62, which is only used thereby, to read frame data. The frame-read processing section 61 and the frame-read processing section 62 access a file system 63 and a file system 64, respectively, and read data from a recording medium included in the storage device 15.

Figure 8:
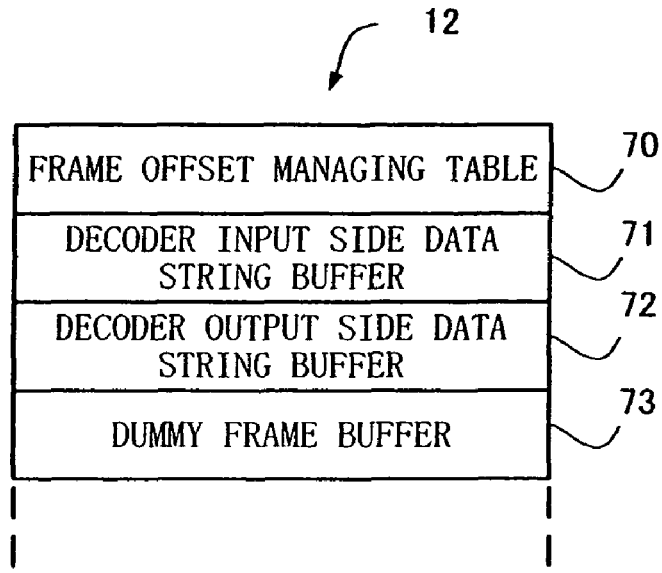
FIG. 8 is a diagram describing an internal storage area of a RAM of the data generating section shown in FIG. 1.

Referring to FIG. 8, an internal storage configuration of the RAM 12 will be described. The internal storage area of the RAM 12 includes a frame offset managing table 70, a decoder input side data string buffer 71, a decoder output side data string buffer 72, and a dummy frame buffer 73. The frame offset managing table 70 temporarily stores a combination of a frame number and offset value of compressed audio data. The decoder input side data string buffer 71 temporarily accumulates the compressed audio data before being inputted to the decoder 14. The decoder output side data string buffer 72 temporarily stores PCM data decoded by the decoder 14. The dummy frame buffer 73 is an area for temporarily storing data used when generating a silent dummy frame to be described below. Note that in a case where music data to be read from the storage device 15 is uncompressed PCM data, it is not necessary to have the frame offset managing table 70, the decoder input side data string buffer 71, the decoder output side data string buffer 72, and the dummy frame buffer 73.

By the data generating microcomputer 11 and the RAM 12, which are configured in the aforementioned manner, it becomes possible to realize data reading means for reading, by designating a recording position on a recording medium, a fragment of compressed audio data, which is required for generating a fragment of digital sampling data corresponding to an arbitrary real time period. Specifically, an arithmetic processing designates a position on the recording medium, at which a fragment of compressed audio data requested by the reproduction controlling section 20, the fragment of compressed audio data being required for generating a fragment of PCM data corresponding to an arbitrary real time period, is stored. Then, the designated recording position is notified to the storage device 15 and the decoder 14, and the fragment of digital sampling data, corresponding to the arbitrary real time period, which is requested by the reproduction controlling section 20 is transferred to the reproduction controlling section 20.

Preferably, in the present embodiment, each of the reproduction controlling section 20 and the data generating section 21 causes one CPU to perform an arithmetic processing, and includes a plurality of communication paths and a plurality of data transfer paths, thereby realizing a synchronization process. If a processing speed of a microcomputer is significantly fast, two microcomputers included in the reproduction controlling section 20 and the data generating section 21 may be one.

Figure 9:
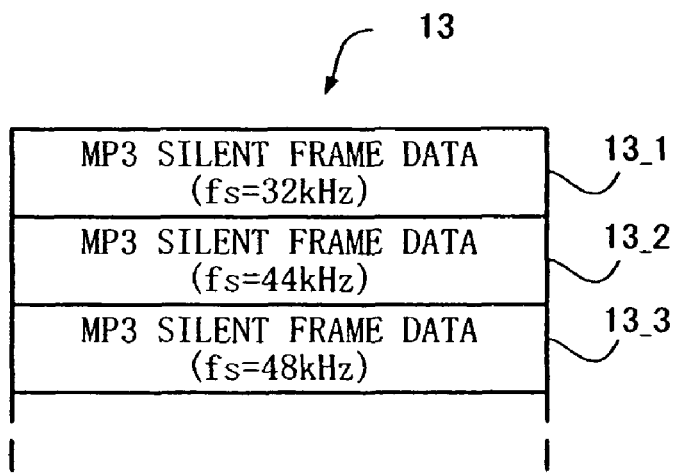
FIG. 9 is a diagram illustrating an internal storage area of a ROM of the data generating section shown in FIG. 1.

Referring to FIG. 9, an internal storage configuration of the ROM 13 will be described. The ROM 13 includes a MP3 silent frame data area 13_1, a MP3 silent frame data area 13_2, and a MP3 silent frame data area 13_3, each of which stores MP3 data encoded at a different sampling frequency. Note that the MP3 silent frame data is a data string used when generating the silent dummy frame to be described below.

Next, reproduction means using the aforementioned configuration will be described step by step. Firstly, a case where compressed audio data is reproduced from a beginning thereof will be described. In the present embodiment, one frame is a minimum unit for reading data. In a case of a CD-DA, one second includes 75 frames. In a case of 16-bit stereo sampling data having a sampling frequency of 44.1 kHz, an amount of data corresponding to one second is 176400 (44100×4) bytes. Therefore, an amount of data corresponding to one frame is 2352 (176400/75) bytes. In an initial state, the PCM reproduction buffer 44 has no PCM data to be reproduced stored therein. Thus, a sound cannot be reproduced. In order to cause the PCM reproduction buffer 44 to be in a state of reproducing a sound, a preparation process indicated by the following steps ST1 to ST11 is performed.

<Step ST1>

In the present embodiment, when music data corresponding to K seconds (K×75 frames) starting from a reproduction start point is prepared in the PCM reproduction buffer 44, the reproduction can be performed. K is preferably an arbitrary natural number. Among a process of preparing music data corresponding to K seconds in the PCM reproduction buffer 44, the process performed by the reproduction controlling section 20 has been already described with reference to the flowchart of FIG. 4. That is, in a PCM data pre-read process, a request for obtaining data starts to be issued to the data generating section 21 via the microcomputer communication controlling sections 37 and 50 (step S80).

Note that a data request signal i2 includes information for specifying target music data such as an album number, a track number, a read-start frame number, and the number of frames to be read. The album number and the track number do not need to uniquely define corresponding music. Instead, the album number and the track number may specify a position of a target music file in the storage device 15. In this case, no data is stored in the PCM reproduction buffer 44, and the compressed audio data is reproduced from a beginning thereof. Thus, read-start data, having 1 as the album number, 1 as the track number, 0 frame as the read-start frame number, and 1 as the number of frames to be read, is requested, for example.

<Step ST2>

Upon receiving the data request signal i2, the medium managing section 51 of the data generating section 21, when a requested track (MP3 file) is not yet open, opens the track (MP3 file) so as to prepare for reading data.

<Step ST3>

Figure 10:
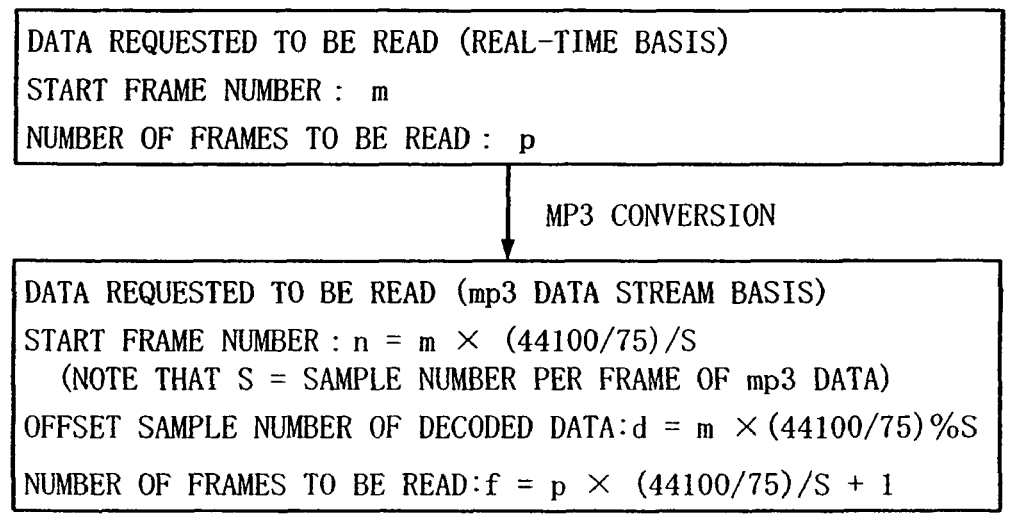
FIG. 10 is a diagram describing an MP3 conversion according to the present invention.

Because the read-start frame number received by the data generating section 21 is a real-time frame number, the read-start frame number is converted to a MP3 frame number. As shown in FIG. 10, there is a correlation "n=m(44100/75)/S" between a frame number n of a frame of MP3 data and the m-th real-time frame corresponding to the frame number n of MP3. Note that S indicates the number of pieces of sample data contained in one frame of MP3 data, and the number of piece of the sample data is 1152, 1058, and 1586 at a sampling frequency of 44.1 kHz, 48 kHz, and 32 kHz, respectively. In this case, data corresponding top real-time frames is equivalent to MP3 data corresponding to the number of frames calculated by p×(44100/75)/S+1 frame. Thus, in order to obtain the data corresponding to the p real-time frames, MP3 data corresponding to the number of frames calculated by p×(44100/75) S+1 frame has to be decoded. Such a conversion from the number of frames of PCM data to the number of frames of MP3 data is processed in a frame conversion section 56.

<Step ST4>

The data generating section 21 newly registers the converted number of frames of MP3 data and the number of bytes counting from a beginning of a track (a beginning of MP3 file excluding a header) in the frame offset managing table 70. It is apparent that an offset value of a first frame of MP3 data is 0. However, an offset value of a second frame of the MP3 data is determined in accordance with a size of the first frame thereof. Although a size of a frame of MP3 data is determined based on a MPEG format (version) of the frame, a bit rate, a sampling frequency, etc, the size of the frame can be obtained by analyzing a frame header provided at a head of each frame data. Such a frame offset registration/reference process is processed in a frame offset managing section 57.

<Step ST5>

The data generating section 21 reads a frame header of head frame data from a file so as to calculate a frame size of the head frame data, thereby registering a number and an offset value of a subsequent frame in the frame offset managing table 70. Simultaneously, the data generating section 21 reads the head frame data (compressed audio data) in the decoder input side data string buffer 71, thereby instructing the decoder 14 to decode the head frame data.

<Step ST6>

The decoder 14 converts the frame data (compressed audio data) stored in the decoder input side data string buffer 71 to PCM data, so as to be decompressed in the decoder output side data string buffer 72.

<Step ST7>

A similar process is performed for the second frame.

An offset value of a third frame is registered in the frame offset managing table 70, and data of the second frame is read in the decoder input side data string buffer 71, thereby instructing the decoder 14 to decode the data of the second frame.

<Step ST8>

The decoder 14 decompresses PCM data obtained by decoding the data of the second frame (compressed audio data) stored in the decoder input side data string buffer 71 in the decoder output side data string buffer 72.

<step ST9>

The data generating section 21 extracts, based on a conversion result obtained by step ST3 mentioned above, only data requested by the reproduction controlling section 20 from among the PCM data decompressed in the decoder output side data string buffer 72, so as to be transferred to the reproduction controlling section 20. That is, the data decompressed in the decoder output side data string buffer 72 is decompressed based on the number of frames having been converted in step ST3. Therefore, because an amount of the decompressed PCM data is greater than that of data requested by the reproduction controlling section 20, the PCM data needed to be extracted.

Figure 11:
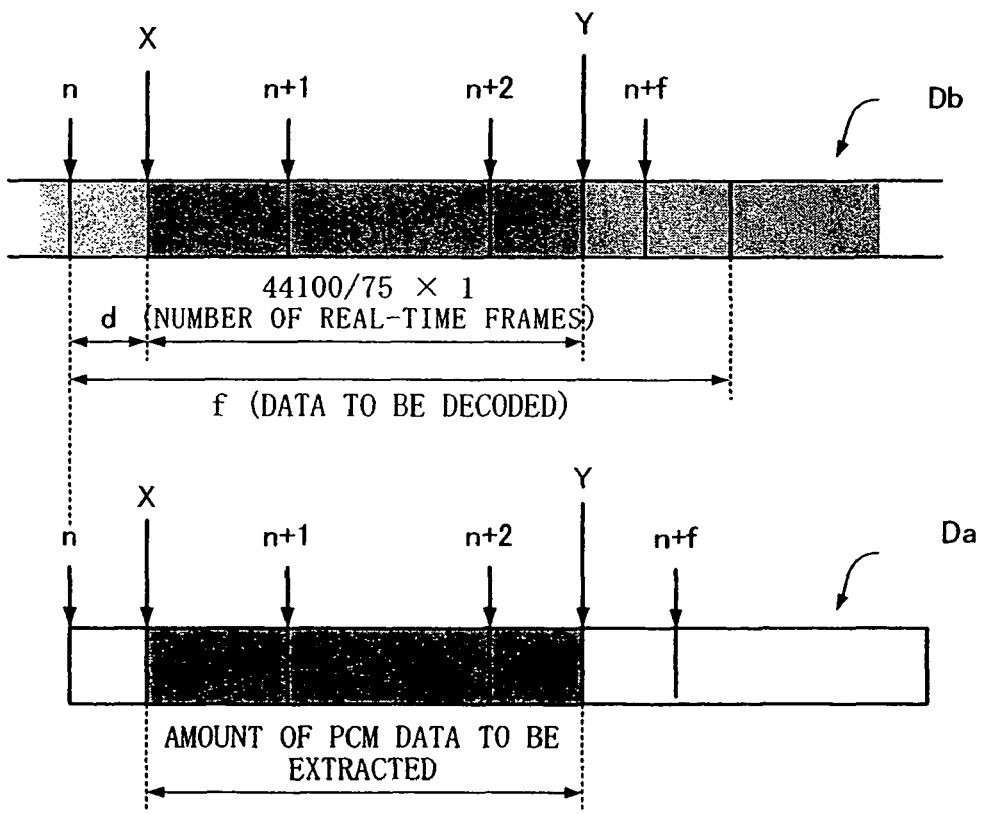
FIG. 11 is a diagram describing a correlation between an amount of MP3 data to be extracted and an amount of PCM data to be extracted according to the present invention.

FIG. 11 schematically illustrates the aforementioned data extraction. In FIG. 11, an upper image schematically shows an MP3 data stream, and a lower image schematically shows decoded PCM data. In order to facilitate the understanding of the following description, the MP3 data stream and the decoded PCM data shown in FIG. 11 are referred to MP3 data before being decoded Db and decoded PCM data Da, respectively.

The MP3 data before being decoded Db contained from an n frame to an n+f frame is decompressed so as to generate the decoded PCM data Da. Note that in the decoded PCM data Da, an amount of data per frame is fixed. Thus, an extraction point X-Y is uniquely determined, and data contained in a portion corresponding to the extraction point X-Y is extracted so as to be transferred to the reproduction controlling section 20. Note that the portion extracted from the decoded PCM data Da is referred to extracted PCM data D.

<ST10>

The reproduction controlling section 20, which has received data corresponding to one frame, disposes the received data at a head of the PCM reproduction buffer 44, and requests a sequential frame having 1 as the album number, 1 as the track number, 1 frame as the read-start frame number, and 1 as the number of frames to be read.

<ST11>

The reproduction controlling section 20 disposes data received at a current time in the PCM reproduction buffer 44 so as to be continued from data received at an immediately preceding time. If such an operation is repeated 75 times, data corresponding to one second is accumulated in the PCM reproduction buffer 44, thereby making it possible to perform the reproduction.

In the present embodiment, a reproduction controlling process, a PCM data generating process, and a reproduction process are performed in an individual manner, each functioning as a parallel processing. The preparation process performed in steps ST1 to ST11 can be started immediately after the power source of the audio reproduction device SRA is turned on, or immediately after the storage device 15 recognizes the recording medium. Therefore, it is possible to immediately start to perform a reproduction in response to a reproduction start order issued from the user. In order to facilitate the understanding the following description, it is described that the reproduction controlling section 20 requests subsequent data after receiving data. However, in a case where the reproduction is continuously performed, a speed of performing such a process is slower than a speed at the reproduction is continuously reproduced. Thus, a task of requesting data and a task of decompressing data are provided in an individual manner so as to be separated from each other, thereby preventing a waiting time from being generated.

Next, a method of immediately reproducing music, comprised of a compressed audio data string, from an intermediate position of the music will be described. The user firstly designates an immediate reproduction start point for immediately performing a reproduction. The immediate reproduction start point is set by pushing down the reproduction start point setting button 6 when a reproduction point of the music moves to a point at which the user wishes to set. When the PCM auxiliary buffer managing section 35 detects the reproduction start point setting button 6 having been pushed down, data corresponding to three seconds, for example, starting from the reproduction point is copied (duplicated) in the PCM auxiliary buffer 41.

Simultaneously, the PCM auxiliary buffer managing section 35 issues a request for obtaining offset information to the data generating section 21. Note that the PCM auxiliary buffer 41 may be a removable nonvolatile recording medium.

FIG. 12 illustrates a state of the frame offset managing table 70 of the data generating section 21 at a time of receiving the request. In FIG. 12, numerals s1, s2, and s3 represent frame sizes of an n-th frame, an h+1-th frame, and an n+2-th frame, respectively. That is, in the frame offset managing table 70, a combination of an offset and frame number is accumulated, as a record, from data having been pre-read from the reproduction position.

Upon receiving the request, the frame offset managing section 57 of the PCM data generating section 21 refers to the frame offset managing table 70 so as to obtain an offset value of a requested frame number. The obtained offset value is to be returned to the reproduction controlling section 20. Upon receiving the offset value, the PCM auxiliary buffer managing section 35 of the reproduction controlling section 20 records, in the PCM auxiliary buffer 41, the copied data corresponding to three seconds as well as a set of an album, a track, the number of frames and an offset value, thereby ending a setting process.

If setting information including a set of the album, the track, the number of frames and the offset value is recorded in a nonvolatile memory such as a flash memory, the setting information can be separately retrieved even if the power source of the audio reproduction device SRA is turned off. Alternatively, in a case where the nonvolatile memory is a removable transportable memory medium, the setting information is recorded in such a transportable memory medium, thereby allowing even other devices having the same structure as the audio reproduction device SRA to retrieve the setting information. Furthermore, in a case where each of a plurality of storage media, such as CDs, of the storage device 15 stores the aforementioned data, even if a CD is to be reproduced after being replaced with another CD, the CD can retrieve the aforementioned data having been stored.

However, in a case where the power source of the audio reproduction device SRA is turned off, or in a case where a recording medium is replaced with another recording medium, PCM data, to be reproduced, which is in the vicinity of the immediate reproduction start point, is to be deleted from the buffer. Thus, similarly to the reproduction preparation process mentioned above, immediately after the power source is turned on, or immediately after the recording medium is detected, the PCM data is prepared in the PCM auxiliary buffer 41.

Figure 13:
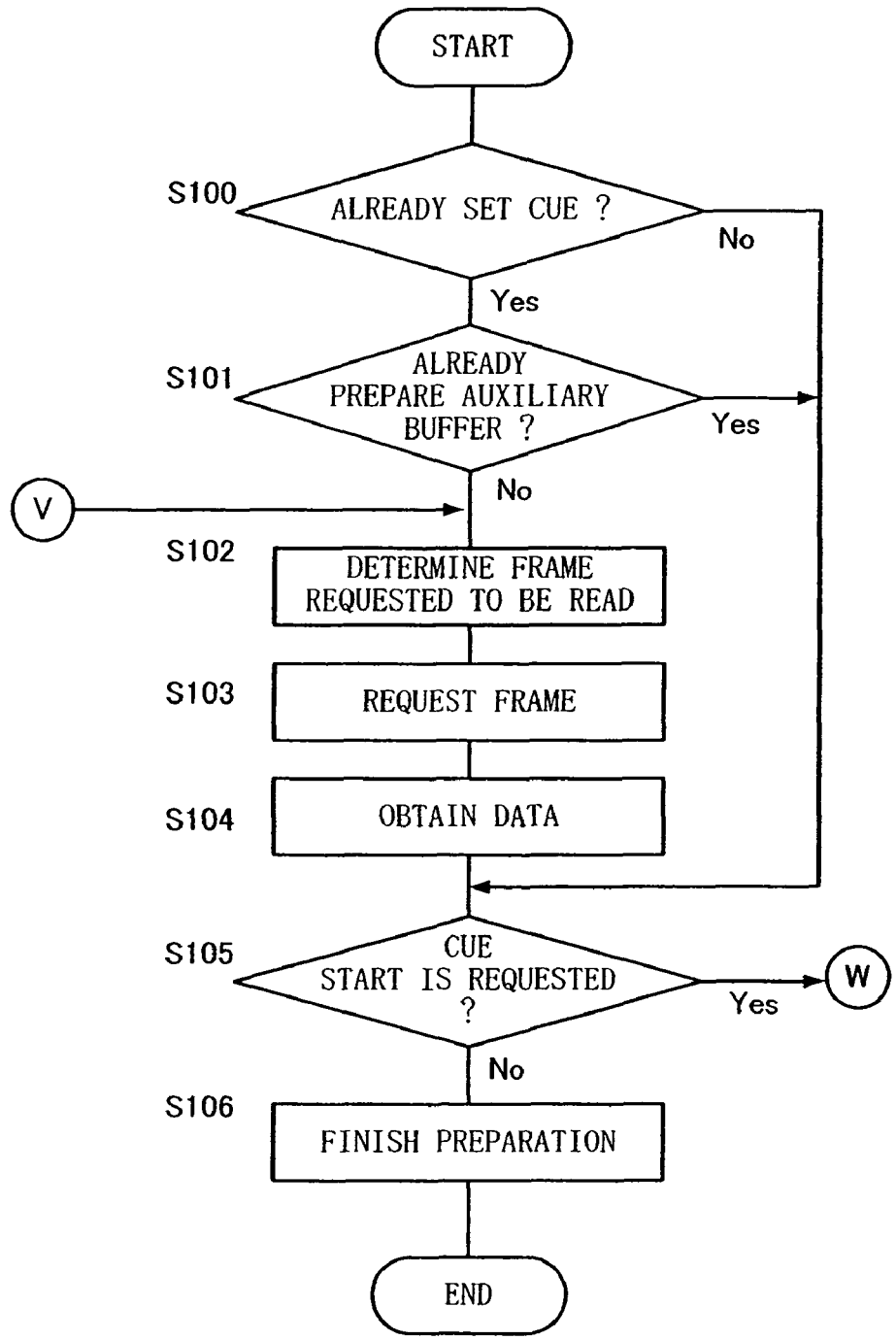
FIG. 13 is a flowchart illustrating an operation of immediately performing a cue reproduction preparation according to the present invention.

Referring to a flowchart shown in FIG. 13, a method of preparing the PCM data in the aforementioned PCM auxiliary buffer 41 will be described. When an operation is started, firstly in step S100, it is determined whether or not the immediate reproduction start point has been set. Specifically, the PCM auxiliary buffer managing section 35 refers to immediate reproduction start point (cue) setting information retained by the UI processing section 31, thereby determining whether or not the immediate reproduction start point has been set. When the immediate reproduction start point has been set, the determination is Yes. Then, the control proceeds to subsequent step S101.

In step S101, it is determined whether or not the auxiliary buffer has been prepared. Specifically, it is determined whether or not corresponding PCM data, to be reproduced, which is in the vicinity of the immediate reproduction start point remains in the PCM auxiliary buffer 41. When no PCM data remains therein, the determination is NO; i.e., it is determined that the auxiliary buffer has not yet been prepared. Then, the control proceeds to subsequent step S102.

In step S102, a frame, containing a fragment of PCM data to be prepared, is determined. Then, the control proceeds to subsequent step S103.

In step S103, the frame determined in step S102 are requested. Specifically, together with the setting information including the album, the track, the number of frames and the offset value, which has already been stored, data of the frame is requested to the data generating section 21. Then, the control proceeds to subsequent step S104.

In step S104, audio data of the frames requested in step S103 is obtained. Note that by providing the offset value for the data generating section 21, the data generating section 21 can seek directly to a target frame, thereby making it possible to shorten a time period required for extracting the data. Then, the control proceeds to subsequent step S105.

Note that when the determination is No in step S100, and when the determination is Yes in step S101, the control proceeds to step S105.

In step S105, it is determined whether or not a cue start has been requested. When the cue start has been requested, the determination is Yes, and then the control proceeds to step S110 to be described below. On the other hand, when the cue start has been not yet requested, the determination is No, and then the control proceeds to subsequent step S106.

In step S106, a fragment of PCM data extracted by the data generating section 21 is stored in any of the PCM auxiliary buffers 41_1 to 41_α. Thereafter, the preparation process is ended.

Figure 14:
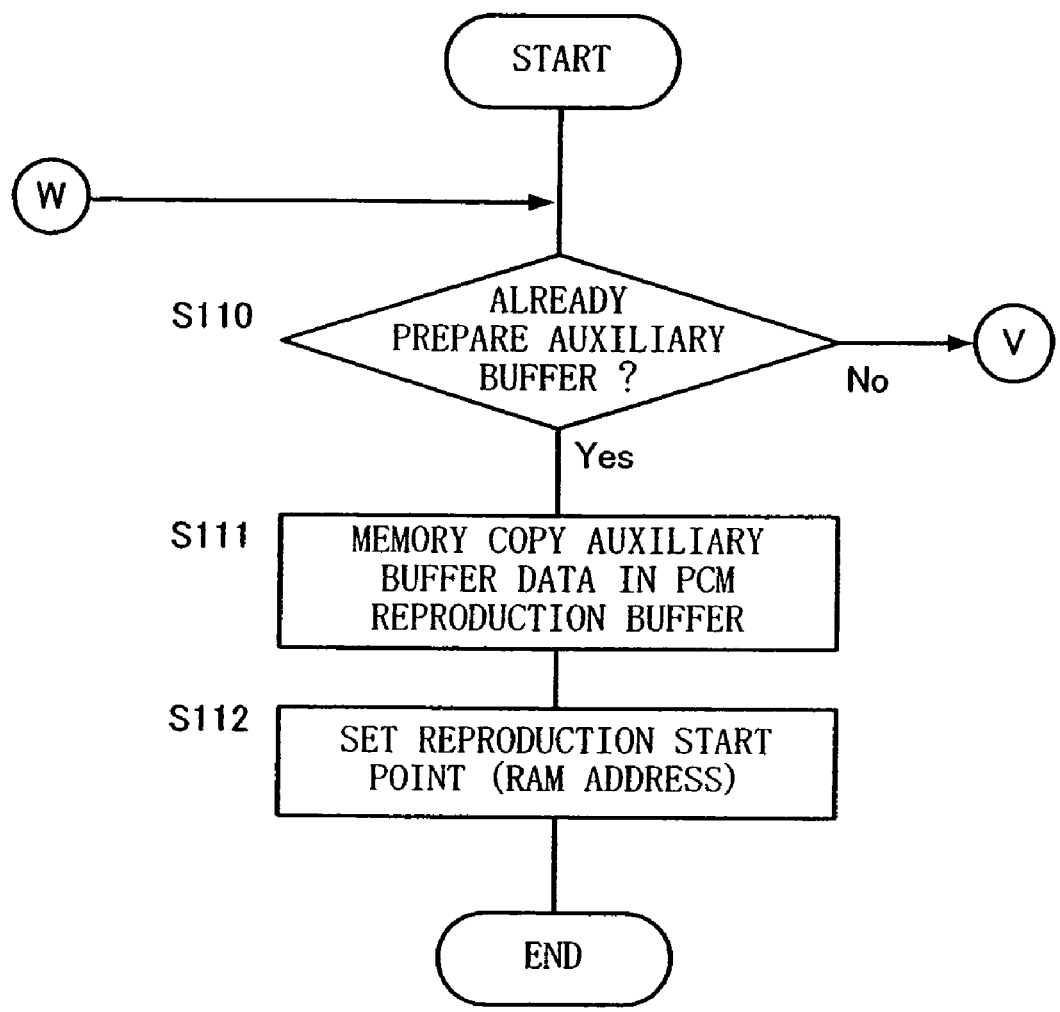
FIG. 14 is a flowchart illustrating an operation of immediately performing the cue reproduction controlling process according to the present invention.

Next, referring to a flowchart shown in FIG. 14, a method in which the user designates the reproduction point having been set in the aforementioned manner so as to immediately start to perform a reproduction will be described. When the user pushes down the reproduction start point calling button 5, the UI processing section 31 detects the reproduction start point calling button 5 having been pushed down. Then, the UI processing section 31 notifies the PCM auxiliary buffer managing section 35 of the reproduction controlling section 20 that a cue reproduction is requested. Then, in response to the requested cue reproduction, a reproduction process performed by the PCM auxiliary buffer managing section 35 is started.

Firstly, in step S110, it is determined whether or not the PCM auxiliary buffer 41 has been prepared. Specifically, it is determined whether or not the PCM data is stored in any of the PCM auxiliary buffers 41_1 to 41_α. When the PCM data is stored, the determination is Yes; i.e., it is determined that the PCM auxiliary buffer 41 has been prepared. Then, the control proceeds to subsequent step S111.

In step S111, PCM data corresponding to the requested reproduction is read from the PCM auxiliary buffer, and the read PCM data is rewritten (copied) in the PCM reproduction buffer 44. Then, the control proceeds to subsequent step S112.

In step S112, the reproduction processing circuit 8 is notified of a RAM address of the reproduction start point, and an instruction for reproducing the PCM data, having been rewritten in the PCM reproduction buffer 44, from the beginning thereof is issued. Simultaneously, the data generating section 21 is notified of the album, the track, the number of frames and the offset value, which have already been set. Then, the process is ended.

Figure 15:
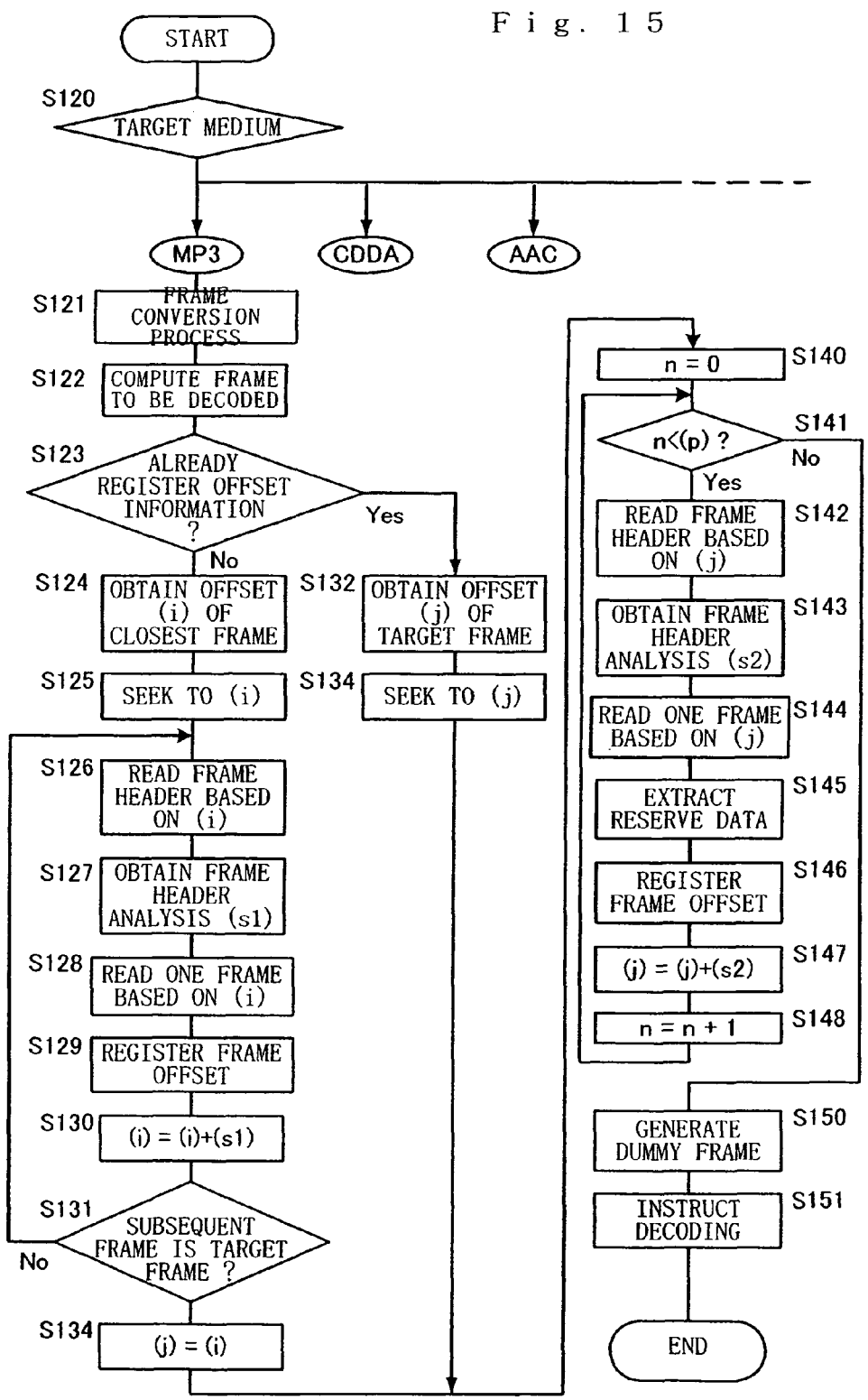
FIG. 15 is a flowchart illustrating an operation of PCM data generating process according to the present invention.

Then, referring to a flowchart shown in FIG. 15, a process performed by the data generating section 21 in response to a request for obtaining PCM frame data will be described. Upon receiving the request for obtaining the PCM frame data, in step S120, the data generating section 52 branches an analytical process based on recording medium information managed by the medium managing section 51. In the present embodiment, the analytical process is branched to a process performed for MP3, CDDA or AAC, in accordance with contents of the recording medium being reproduced. Note that due to space imitation, in the present embodiment, the process performed for MP3 will be described below. However, the process performed for CDDA or AAC is the same as that performed for MP3. Then, the control proceeds to subsequent step S121.

In step S121, a frame conversion process is performed. Specifically, the frame conversion section 56 converts the number of read-start frames (real-time frames) requested by the reproduction controlling section 20 to the number of MP3 frames. Then, the control proceeds to subsequent step S122.

In step S122, a frame number of a frame in which the decoding is started is determined. Specifically, as a frame in which the decoding is started, a frame number of a frame preceding a current frame by several frames is determined. In other words, as described above, MP3 data of the current frame is configured such that continuous audio data can be obtained if the MP3 data is decoded sequentially from the beginning thereof. Also, due to a bit reservoir, there may be a case where data of a target frame is included in a frame immediately preceding the target frame. Therefore, in order to obtain the continuous PCM data, the decoding is started from the frame preceding the current frame by several frames, taking into consideration the decoding process and the bit reservoir.

A determination, performed in step S122, of a frame in which the decoding is started, will be more specifically described. In order to extract PCM data so as to be continued from previous audio data, it is sufficient to start to perform the decoding from a MP3 frame preceding a corresponding MP3 frame by two frames. Furthermore, for performing a bit reservoir process, it is necessary to use the number of previous frames containing data corresponding to a maximum of 512 bytes. Note that the number of previous frames (p) differs depending on a sampling frequency. For example, when the sampling frequency is 44.1 kHz, all reserved data can be obtained by using data contained in 8 previous frames. The number of previous frames counting from the target frame is denoted by (p). In this case, (p) indicates 10(2+8). When the frame in which the encoding is started is determined in the aforementioned manner, the control proceeds to subsequent step S123.

In step S123, it is determined whether or not the offset information has been registered. Specifically, the frame offset managing section 57 causes the frame offset managing table 70 to search for a read-start frame. Different from the reproduction performed from the beginning of music, in a case where the cue reproduction is performed from the intermediate position of the music, the offset information is rarely registered. When the offset information has not yet been registered, the determination is No. Then, the control proceeds to step S124.

In step S124, a frame offset value (i) of a frame closest to the target frame is obtained. Note that due to space limitation, in FIG. 15, the frame offset value (i) is denoted by (i). Then, the control proceeds to subsequent step S125.

In step S125, seeking is performed to the frame offset value (i). Then, in step S126, a frame header is read based on the frame offset value (i). Thereafter, in step S127, the read frame header is analyzed, thereby obtaining a frame size (s1).

In step S128, the frame size (s1) of corresponding data of one frame is read based on the frame offset value (i). In step S129, a head of a subsequent frame (i.e., (i)=(i)+s1) is registered. Then, in step S130, a value of the frame offset value (i)+the frame size (s1) is set as a frame offset value of the subsequent frame (i).

In step S131, it is determined whether or not the subsequent frame is a target frame. The control returns to step S126 mentioned above until it is determined that the subsequent frame is the target frame. As such, by repeating step S126 to S131, the PCM data is read frame by frame until the head of the subsequent frame is reached.

On the other hand, when the determination is Yes in step S123 mentioned above, i.e., when it is determined that the offset information has been registered, the control proceeds to subsequent step S134.

In step S134, a frame offset value (i) is set as a frame offset value (j) of a target frame. Then, the control proceeds to step S132.

In step S132, the frame offset value (j) of the target frame is obtained. Note that due to space limitation, in FIG. 15, the frame offset value (j) is denoted by (j). Then, the control proceeds to subsequent step S133.

In step S133, seeking is performed to the frame offset value (j). Then, the control skips steps S126 to S131 mentioned above, and proceeds to step S140. As described above, different from the reproduction performed from the beginning of music, in the case where the cue reproduction is performed from the intermediate position of the music, the offset information is rarely registered. Thus, a frame, notified by the reproduction controlling section 20, in which the decoding is started and an offset value of the frame are newly registered in the frame offset managing table 70, and simultaneously, seeking is performed directly to the offset value of the frame.

As a result of performing the aforementioned process, a file pointer is moved to a head of the frame in which the decoding is started. Thereafter, in step S140, n=0 is set. Then, the control proceeds to subsequent step S141.

In step S141, it is determined whether or not n<p is satisfied. At this time, because n=0 has been set in immediately preceding step S140, the determination is Yes. Then, the control proceeds to subsequent step S142.

In step S142, a corresponding frame header is read based on the frame offset value (j). Then, the control proceeds to subsequent step S143.

In step S143, the read frame header is analyzed, thereby obtaining a frame size (s2). Then, the control proceeds to subsequent step S144.

In step S144, corresponding data of one frame is read based on the frame offset value (j). Then, the control proceeds to subsequent step S145.

In step S145, reserve data is extracted. Note that the extracted reserve data is stored in the dummy frame buffer. Then, the control proceeds to subsequent step S146.

In step S146, the frame offset value (j) is registered. Then, in step S146, a value of the frame offset value (j)+ the frame size (s2) is set as the frame offset value (j). Thereafter, in step S148, n=n+1 is set (incremented by 1), and the control proceeds to step S141 mentioned above. When n becomes equivalent to (p), the determination is No in step S141. Thereafter, the control proceeds to step S150.

As described above, by repeating steps S140 to S148 mentioned above, the dummy frame generating section 58 sequentially reads the PCM data frame by frame until the number of frames reaches (p). Simultaneously, the reserve data obtained from each frame is extracted, thereby compiling all the extracted reserve data in the dummy frame buffer (step S145). By sequentially reading the data until the number of frames reaches (p) (No in step S141), all the reserve data is to be complied.

In step S150, a dummy frame containing the compiled reserve data is generated at a rear end of the MP3 silent frame data, encoded at a different sampling frequency, which has been previously formed in the ROM 13. Then, the control proceeds to subsequent step S151.

In step S151, decoding is instructed, and a required number of frames are to be decoded in a sequential manner. Then, the control is ended.

Figure 16:
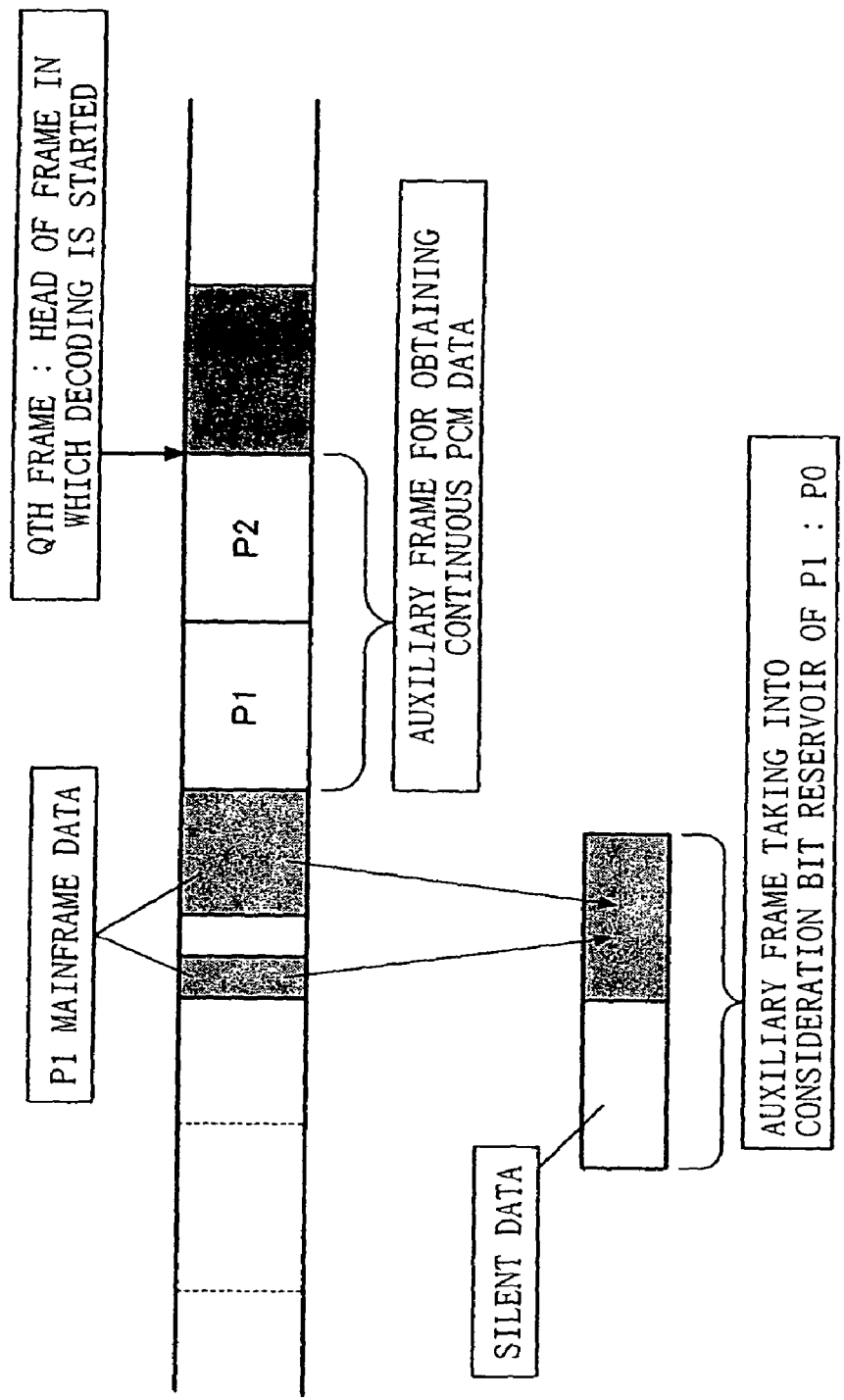
FIG. 16 is a diagram illustrating frames to be decoded according to the present invention.

Referring to FIG. 16, a concept, of string, which includes a generation of a dummy frame, will be described. Mathematically, the decoding should be started from a Q frame in order to obtain target PCM data. For obtaining continuous PCM data without breaking a decoder, however, it is necessary to sequentially decode a P1 frame preceding the Q frame by two frames and a P2 frame preceding the Q frame by one frame. Furthermore, for processing reserve data of the P1 frame so as not to generate any inconsistency, it is necessary to read the number of previous frames containing data corresponding to a maximum of 512 bytes, compile the read data of a frame such as a P0 frame including a silent segment, and cause the decode controlling section 59 to issue an instruction to decode the frames in an order of P0, P1 and P2. Note that in FIG. 16, the P0 frame is an auxiliary frame taking into consideration a bit reservoir of the P1 frame. A first half and a second half of the P0 frame compile silent data and main-frame data of the P1 frame, respectively.

The decoder 14 sequentially converts MP3 data to PCM data, and decompresses the PCM data in the decoder output side data string buffer 72. The PCM data transfer controlling section 60 extracts frames of PCM data requested by the reproduction controlling section 20, thereby transferring the extracted frames to the reproduction controlling section 20.

As described above, in the present embodiment, digital sampling data is supplied from a recording medium of the storage device to both ends of digital sampling data stored in the PCM reproduction buffer 44, employed as data storage means, thereby making it possible to continuously reproduce, in accordance with a rotation of the rotational operation element 1, a sound in a forward direction or a backward direction at an arbitrary speed.

Note that the present embodiment illustrates an example where a recording medium of the storage device 15 is a CD-ROM. However, the recording medium of the storage device 15 may be a magneto-optical disk, a hard disk, or a semiconductor storage device.

INDUSTRIAL APPLICABILITY

As described above, according to the configuration of the present invention, an audio data reproduction device capable of reproducing audio data and compressed audio data freely changing a reproduction speed, and capable of immediately starting to perform a reproduction from an arbitrary reproduction start point which is previously designated so as to continuously perform the reproduction in an forward or a backward direction at an arbitrary speed. Furthermore, in order to realize the audio data reproduction device, only several bytes are required as a capacity of a temporary storage element such as a RAM having a high-speed access performance, thereby allowing the audio data reproduction device to be configured at a relatively low cost. Still furthermore, because the compressed audio data is used, a capacity of the storage device used per music can be reduced. Thus, a size reduction of the reproduction device may be realized. A device having such features is applicable to not only a device for a DJ but also a device for performing linear editing of an image or sound, a device for generating a sound effect, and the like. Furthermore, if the audio data reproduction device is incorporated into a household audio device, a user can easily enjoy editing the audio data as he or she likes. As such, according to the configuration of the present invention, the audio data reproduction device has a high industrial applicability.

The invention claimed is:

1. An audio reproduction device comprising:
   a recording medium for recording compressed audio data;
   decoding means for converting the compressed audio data to real-time digital sampling data;
   data reading means for reading a compressed audio data frame of the compressed audio data from the recording medium, and generating and reading a fragment of the real-time digital sampling data by means of the decoding means;

data storage means for temporarily storing a first fragment of the real-time digital sampling data read by the data reading means; and reproduction means for reproducing, in an order of time, the first fragment of the real-time sampling data stored in the data storage means in one of a forward direction and a backward direction at a variable speed, wherein the data reading means (i) designates a recording position of the compressed audio data frame corresponding to a second fragment, of the real-time digital sampling data, which is disposed at both ends of the first fragment of the real-time digital sampling data, (ii) reads the compressed audio data frame corresponding to the second fragment of the real-time digital sampling data, such that the second fragment of the real-time digital sampling data is supplied to the data storage means, and (iii) continuously reproduces, by means of the reproduction means, a series of the compressed audio data in the forward direction and the backward direction at an arbitrary speed, and wherein the recording medium, which is to be reproduced, temporarily stores a reproduction point, designated by the data reading means, of the compressed audio data corresponding to the first fragment of the real-time digital sampling data, such that the reproduction point is retrievable when the recording medium starts to be subsequently reproduced.

2. An audio reproduction device comprising:

a recording medium for recording compressed audio data;

decoding means for converting the compressed audio data to real-time digital sampling data;

data reading means for reading a compressed audio data frame of the compressed audio data from the recording medium, and generating and reading a fragment of the real-time digital sampling data by means of the decoding means;

data storage means for temporarily storing a first fragment of the real-time digital sampling data read by the data reading means; and reproduction means for reproducing, in an order of time, the first fragment of the real-time sampling data stored in the data storage means in one of a forward direction and a backward direction at a variable speed, wherein the data reading means (i) designates a recording position of the compressed audio data frame corresponding to a second fragment, of the real-time digital sampling data, which is disposed at both ends of the first fragment of the real-time digital sampling data, (ii) reads the compressed audio data frame corresponding to the second fragment of the real-time digital sampling data, such that the second fragment of the real-time digital sampling data is supplied to the data storage means, and (iii) continuously reproduces, by means of the reproduction means, a series of the compressed audio data in the forward direction and the backward direction at an arbitrary speed, and wherein the recording medium, which is to be reproduced, temporarily stores a reproduction point, designated by the data reading means, of the compressed audio data corresponding to the second fragment of the real-time digital sampling data in a removable nonvolatile recording medium, such that the reproduction point is retrievable when the recording medium starts to be subsequently reproduced.

3. An audio reproduction device comprising:

a recording medium for recording compressed audio data;

decoding means for converting the compressed audio data to real-time digital sampling data;

data reading means for reading a compressed audio data frame of the compressed audio data from the recording medium, and generating and reading a fragment of the real-time digital sampling data by means of the decoding means;

data storage means for temporarily storing a first fragment of the real-time digital sampling data read by the data reading means; and reproduction means for reproducing, in an order of time, the first fragment of the real-time sampling data stored in the data storage means in one of a forward direction and a backward direction at a variable speed, wherein the data reading means (i) designates a recording position of the compressed audio data frame required for generating a second fragment, of the real-time digital sampling data, which is disposed at both ends of the first fragment of the real-time digital sampling data, (ii) reads the compressed audio data frame required for generating the second fragment of the real-time digital sampling data, (iii) decodes, before decoding the read compressed audio data frame, a dummy frame containing data obtained by compressing a silent portion and several frames immediately preceding the compressed audio data frame, and reading the dummy frame containing the data obtained by compressing the silent portion and the several frames immediately preceding the compressed audio data, such that a continuity of the real-time digital sampling data is retained at a boundary between the first fragment of the real-time digital sampling data and the second fragment of the real-time digital sampling data, and (iv) continuously reproduces, by means of the reproduction means, a series of the compressed audio data in the forward direction and the backward direction at an arbitrary speed.

* * * * *